(12) United States Patent
Wong et al.

(10) Patent No.: US 10,019,695 B2
(45) Date of Patent: Jul. 10, 2018

(54) COMPUTERIZED SYSTEMS AND METHODS FOR SCHEDULING, AND SENDING INDIVIDUALIZED ELECTRONIC INVITES TO, A COMPOUND MEETING

(71) Applicant: iCIMS, Inc., Matawan, NJ (US)

(72) Inventors: Alex Wong, Matawan, NJ (US);
Sanjeev Bhatia, Marlboro, NJ (US);
Michael Naman, Piscataway, NJ (US)

(73) Assignee: iCIMS, Inc., Mataway, NJ (US)

( * ) Notice: Subject to any disclaimer, the term of this patent is extended or adjusted under 35 U.S.C. 154(b) by 639 days.

(21) Appl. No.: 14/626,067

(22) Filed: Feb. 19, 2015

(65) Prior Publication Data
US 2016/0247122 A1    Aug. 25, 2016

(51) Int. Cl.
| | |
|---|---|
| G06Q 10/00 | (2012.01) |
| G06Q 10/10 | (2012.01) |
| H04L 12/58 | (2006.01) |
| H04L 29/08 | (2006.01) |
| G06F 3/048 | (2013.01) |
| H04W 4/02 | (2018.01) |

(52) U.S. Cl.
CPC ......... *G06Q 10/1095* (2013.01); *G06F 3/048* (2013.01); *H04L 51/08* (2013.01); *H04L 67/325* (2013.01); *H04W 4/02* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,283,970 B2 | 10/2007 | Cragun et al. | |
| 7,865,387 B2 | 1/2011 | Mansour | |
| 7,984,378 B1 | 7/2011 | Atkins et al. | |
| 8,417,551 B2 * | 4/2013 | Collet | G06Q 10/06311 705/7.12 |
| 8,484,061 B2 * | 7/2013 | Collet | G06Q 10/06311 705/7.12 |
| 2003/0036941 A1 | 2/2003 | Leska et al. | |
| 2006/0026051 A1 | 2/2006 | Rose | |
| 2006/0224430 A1 * | 10/2006 | Butt | G06Q 10/063116 705/7.16 |
| 2009/0228321 A1 | 9/2009 | Srinivasan et al. | |
| 2010/0088144 A1 * | 4/2010 | Collet | G06Q 10/06311 705/7.13 |
| 2011/0149809 A1 * | 6/2011 | Narayanaswamy | H04L 12/1818 370/260 |
| 2012/0191501 A1 | 7/2012 | Olliphant | |
| 2012/0330710 A1 | 12/2012 | Hauser et al. | |
| 2013/0103444 A1 | 4/2013 | Agarwal et al. | |

OTHER PUBLICATIONS

"Newton Launches Next Generation Interview Scheduling Tools for Applicant Tracking System", Press Release, Feb. 10, 2015, 3 pages, PRWeb ebooks, San Francisco, CA.

* cited by examiner

*Primary Examiner* — Gurkanwaljit Singh

(57) ABSTRACT

Computerized systems and methods allow a user, in a single set up process, to set up multiple sub-meetings in a compound meeting and have individualized invites sent to the invited individuals. A dynamic, interactive calendar graphic can be used where the user can drag meeting time indicators for each invited individual to desired time slots. Once suitable meeting times are established, the user can cause the invites to be sent electronically to each invitee, and each invite is individualized to the meeting start and stop times for the recipient.

25 Claims, 12 Drawing Sheets

COMPUTERIZED SYSTEMS AND METHODS FOR SCHEDULING, AND SENDING INDIVIDUALIZED ELECTRONIC INVITES TO, A COMPOUND MEETING

BACKGROUND

In business settings, there are often times where one person has to meet with groups of one or more people in a number of meetings. One example is where a job candidate (a recruit) has to interview with one interviewer after another. In some settings, to schedule the interviews, an electronic appointment invite, specifying the time window and location for each interview, is emailed to each interviewer of each group and to the job candidate. This process, however, is labor-intensive and time consuming because separate invites have to be generated and emailed to each interviewer. To save this time, sometimes one appointment invite is sent to all of the interviewers and the recruit that covers the cumulative time window for all of the serial interviews. The problem with this approach, however, is that the interviewers' electronic calendars will show that they are busy for the entire cumulative time window for the serial interviews, when in fact they are only busy for one interview time slot in that cumulative time window.

SUMMARY

In one general aspect, the present invention is directed to computerized systems and methods through which, in a single set up process, a user can set up multiple sub-meetings in a compound meeting (i.e., a meeting made up of two or more sub-meetings) and have individualized electronic invites sent (e.g., emailed or texted) to the invited individuals. For example, if one individual is only slated to attend one of the sub-meetings, that individual's invite only specifies the start and stop times (and optionally location) for that sub-meeting. On the other hand, if another individual is slated to attend back-to-back (or more) of the sub-meetings, that individual's invite can specify the start of the first sub-meeting and the end of the last sub-meeting as the meeting start and stop times for the individual. In one arrangement, the present invention uses a dynamic, interactive calendar grid (or other graphic) where the user can drag meeting blocks (or indicators) for each invited individual (and optionally the meeting location(s)) to desired time slots. Once suitable meeting times for each invited individual are established, the user can cause the electronic invites to be sent to each invitee, and each invite is individualized to the meeting start and stop times for the recipient. This can alleviate the problems present in the prior art. The user does not need to set up meeting invites for each sub-meeting, nor have to block off times for the entire duration of the compound meeting for all of the invitees. These and other benefits of the present invention will be apparent from the description below.

FIGURES

Various embodiments of the present invention are described herein by way of example in conjunction with the following figures, wherein.

DESCRIPTION

Figure 1:
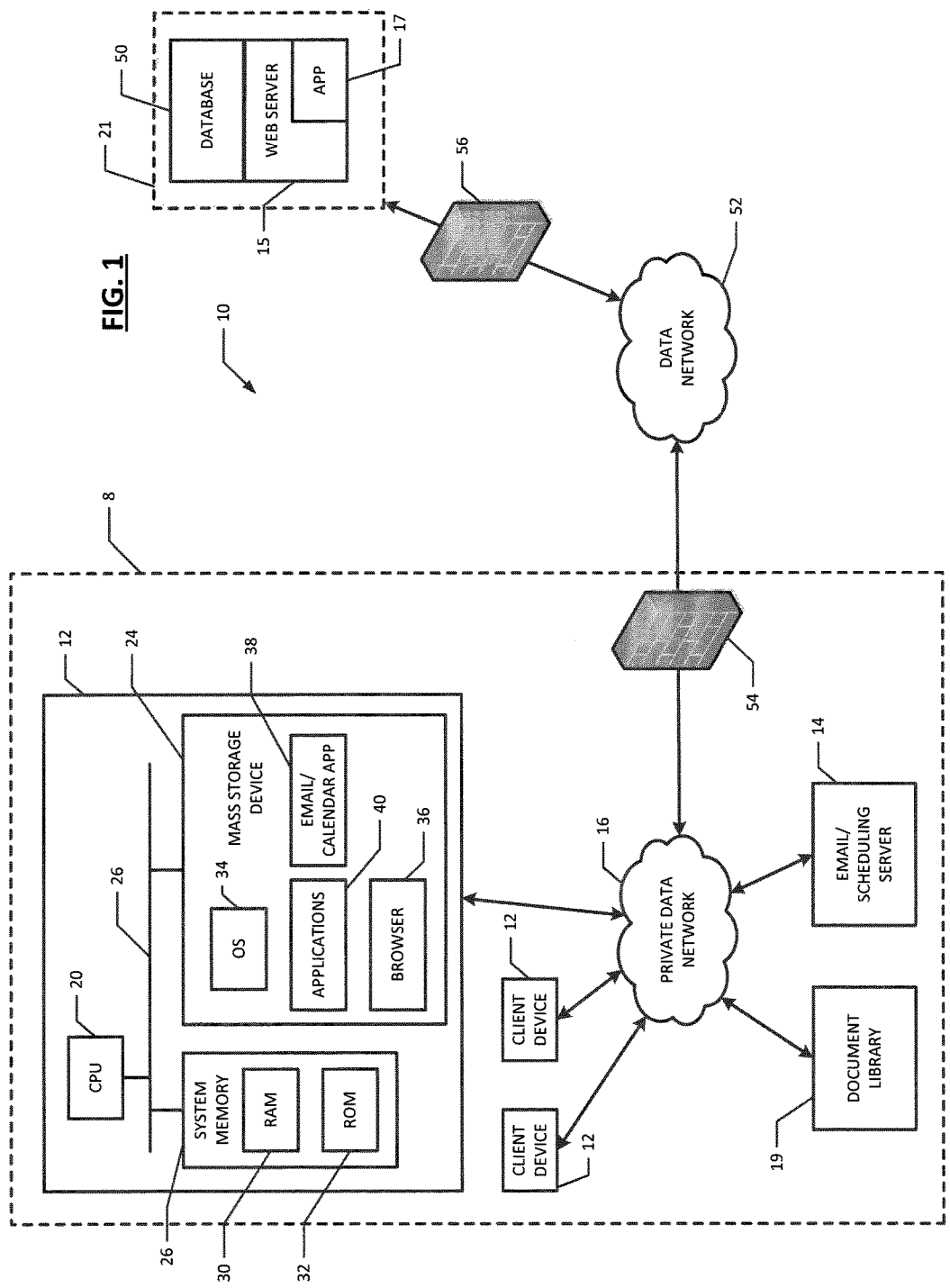
FIGS. 1 and 12 are diagrams of example computer systems according to various embodiments of the present invention.

FIG. 1 is a diagram of an example computer network 10 that can used to implement various embodiments of the present invention for sending (e.g., emailing, texting, or otherwise electronically messaging via a computer network) individualized electronic meeting invites to different invitees for a series of meetings (collectively, a "compound" meeting) from a single meeting set-up process. As shown in FIG. 1, numerous client-computing devices 12 are connected to an enterprise email/scheduling server system 14 via a private data network 16. The client-computing devices 12 may be associated with a common enterprise 8 (e.g., a business, organization, institution, etc.) whose email and scheduling is handled by the email/scheduling server system 14. The email and scheduling server system 14 may include one or more servers that run Microsoft Outlook for the enterprise (e.g., the servers are Microsoft Exchange servers) or some other email/scheduling program. The private data network 16 may be a computer data network comprising, for example, an interconnection of a number of data networks (that employ, for example, the TCP/IP protocol such as LANs, WANs or a corporate area network (CAN)). As shown in FIG. 1, the enterprise 8 may also include a document library 19 for storing electronic documents and other electronic files of the enterprise so that users of the client-computing devices 12 can access the files in the library 19 (if authorized).

Exemplary aspects of one of the client-computing devices 12 are shown in more detail in FIG. 1. The client-computing devices 12 may include a central processing unit (CPU) 20 connected to a system memory 22 and a mass storage device 24 via an internal system bus 26. The system memory 22 may include random access memory 30 (RAM) and read-only memory (ROM) 32, which may be implemented with semiconductor integrated circuits. The mass storage device 24 may be implemented with, for example, one or more hard disk drives, optical disk drives, and/or solid-state drives. The mass storage device 24 and/or the RAM 30 can store a number of software program modules that are executed by the CPU 20. These program modules can include an operating system (OS) 34, one or more browsers 36 (such as Microsoft Internet Explorer, Google Chrome, Mozilla Firefox, etc.), and an email/scheduling application 38 (e.g., Microsoft Outlook). In addition to or in lieu of the email/scheduling application 38, users of the client computing devices 12 may use web-based email/scheduling applications that are run through the browser 36, such as Gmail, Outlook.com, and Yahoo! Mail, for example. The mass storage device 24 and/or the RAM 30 may also store other applications 40 executed by the CPU 20, such as productivity applications (e.g., word processing, spreadsheets, etc.).

Also as shown in FIG. 1, the enterprise 8 is in communication with a host computer system 21 via an electronic data communication network 52 (and appropriate network firewalls 54, 56). The host computer system 21 comprises a web server system 15 that may include one or more networked web servers that host at least one web-based application 17 that a user of a client-computing device 12 can access via the network 52 and the client computing device's browser 36. As described in more detail below, a user of one of the client-computing devices 12, using the web-based application 17, can schedule—and send out individualized email invites for—a compound meeting, having a series of sub-meetings, where multiple people (or multiple groups of people) are scheduled for individual sub-meeting time slots in the compound meeting, through a single meeting set-up process. With this scheduling feature, as described in detail below, the user (referred to below as "the initiator" for clarity) does not need to set-up and schedule multiple meetings for each of the meeting groups. Nor does the initiator have to send out one invite to all of the groups that spans the time window for the entire compound meeting. Instead, the initiator can send out, from his/her client-computing device 12, multiple meeting invites, each particularized to the time window and location of each meeting groups' particular sub-meeting time slot, through a single meeting invite process.

Figure 12:
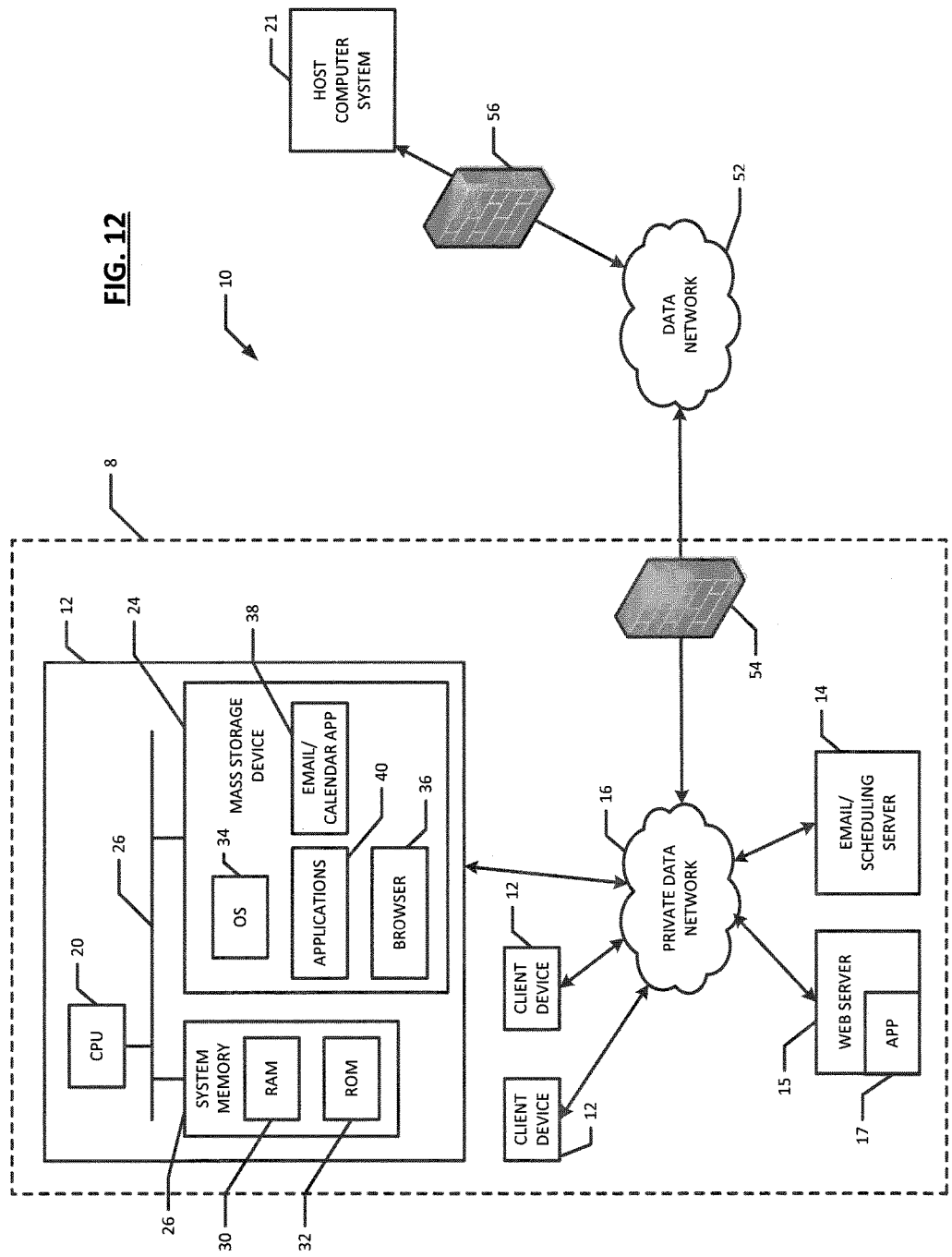

Before describing aspects of the single meeting invite process, the remaining elements of FIG. 1 are described, as an understanding of those elements will facilitate the description to follow. As shown in FIG. 1, the host computer system 21 may also comprise one or more computer databases 50 that store, for example, data used by the web-based application 17 of the web server system 15. For example, in one implementation of the present invention, the application 17 of the web server 15 provides an applicant tracking platform for the enterprise 8, and the database 50 stores data about the applicants (e.g., job candidates or other types of applicants), among other data. The data network 52 may employ the TCP/IP protocol, for example, and may comprise one or more connected computer networks that connect to the enterprise 8 to the host computer system 21, such as the Internet, LANs, WANs, etc. Pertinent to aspects of the present invention, the host computer system 21 may access the enterprise's email system 14 to retrieve data from the email system 14 to be used in its compound meeting scheduling function, such as calendar information (free and busy times) for individuals and other resources (e.g., meeting rooms) associated with the enterprise. In various embodiments, the host data center 21 may access the data from the email system 14 using web services. Note that the private data network 16 and the data network 52 could be considered collectively to be one data network. The enterprise 8 and the host computer system 21 may each have associated network firewalls 54, 56. In other arrangements, as shown in FIG. 12, the web server system 15 could be within enterprise's network. In other arrangements, the client computing devices 12 may download a plug-in that allows the browser 36 to interface with the email/calendaring app 38 via an API, such as an ActiveX plug-in or some other suitable plug-in or extension.

The client-computing devices 12 shown in FIG. 1 could be implemented with desktop computers, servers, laptops, tablets, smart phones, or any other CPU-based computing device capable of connecting the enterprise email/scheduling server 14 and the web server system 15. Of course, the client-computing devices 12 may also include display screens (not shown in FIG. 1) for visually displaying information, including the graphical user interfaces or the web-based application 17 shown below. The client-computing devices 12 may also include input modalities through which a user (e.g., the initiator) can interact with the client-computing device 12, including providing the inputs to set up the appointments in the graphical user interface. The client-computing devices 12 of the enterprise could be distributed across different geographic locations and the enterprise 8 could have multiple enterprise email/scheduling servers 14, such as one for each enterprise location.

In the description herein, the server system 15 is described as a web-server system that provides a web-based application 17. It should be recognized that the present invention is not so limited and that in other embodiments, the server system 15 could provide another type of application (in addition to or in lieu of a web-based application) that the user of the client computing device could access to set up the compound meeting as described herein. The claims use the term "application server system" to encompass the web server system 15 or such other type of application server system. Also, in the description herein, the invites are sent by email by the email server system 14, which also stores and handles calendar data for the enterprise. It should be recognized that the invention is not so limited and that in other embodiments, the invites could be sent by other types of electronic messages, such as texts, instant messages, personal messages, etc. (in addition to or in lieu of email). The claims use the term "messaging server system" to encompass all of these types of electronic messaging. Also, the calendar information for the enterprise could be integrated into the messaging server system or a separate calendaring server system connected to the network 16 could store the calendar information for the enterprise (e.g., free and busy times for individuals and meeting rooms).

Figure 2:
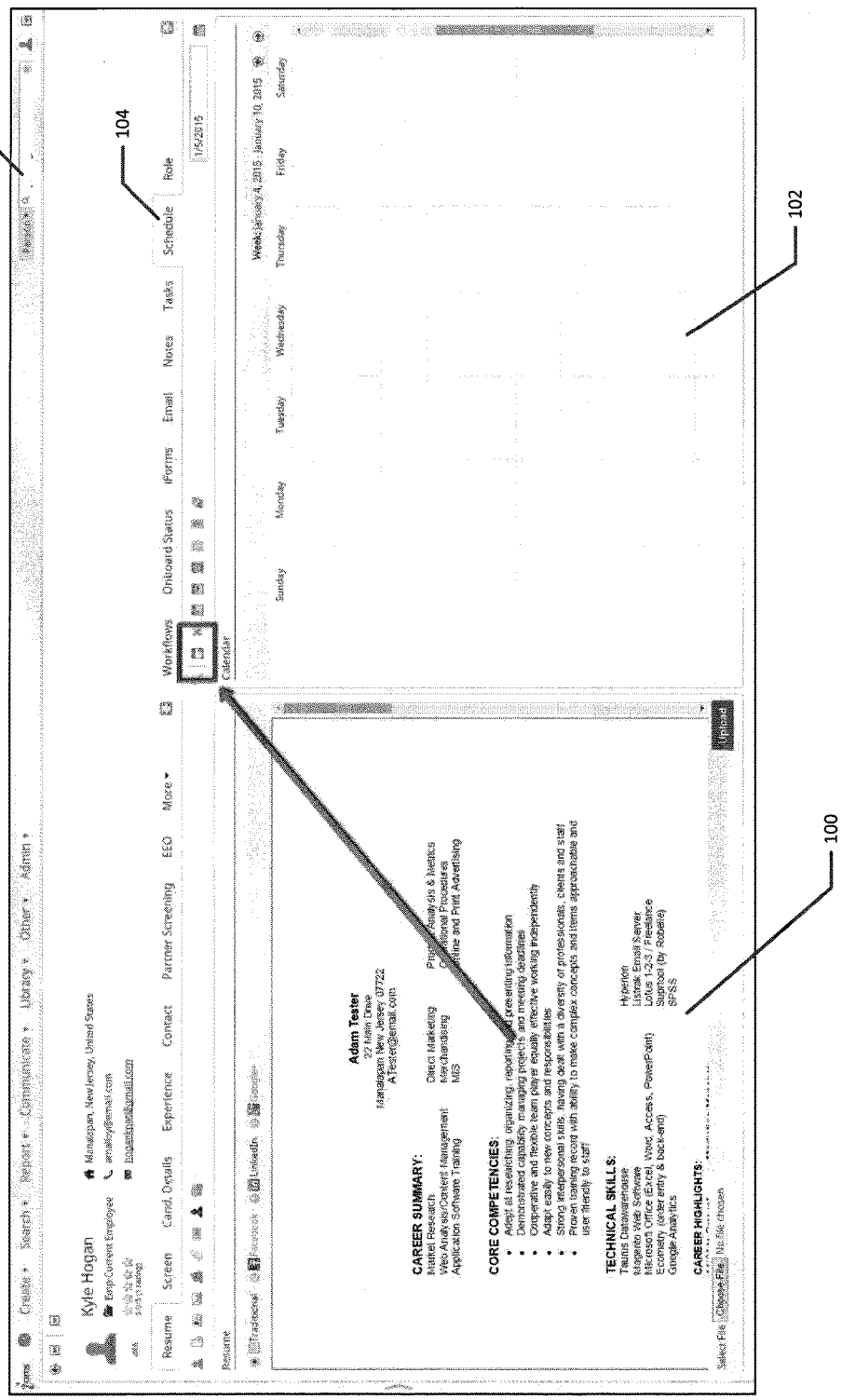
FIGS. 2-10 are screen shots of various displays from an application through which a user can schedule a compound meeting according to various embodiments of the present invention.

FIGS. 2-8 are example screen shots of the graphical user interface provided by the web server system 15 (and the browser 36) to the initiator using the client computing device 12 in order to set up and invite people to the series of meetings according to various embodiments of the present invention. The screen shots may be part of HTML web pages provided by the web server 15 and displayed by the browser 36. In the example of FIG. 2, the browser 36 of the initiator's client-computing device 12 is Google Chrome. Also in the example of FIG. 2, the initiator (Kyle Hogan), at the client-computing device 12, after logging into the application 17 hosted by the web server system 15, is setting up a series of back-to-back job interviews (e.g., sub-meetings) for prospective job candidate (in the illustrated example, Adam Tester) with various members of the enterprise 8, although it should be recognized that the invention is not necessarily so limited and that it can be used for scheduling other types of meetings or in other contexts. In the example of FIG. 2, information about the candidate (in this case, the candidate's resume) is shown on the left side of the screen 100. The candidate information (e.g., resume) may be stored in the database 50 of host computer system 21 such that it is accessible to the web server 15. The right side of the screen can show calendar information 102 (e.g., free and busy times in a scheduling grid) for a selected individual of the enterprise or other individual for which the enterprise email/scheduling server system 14 has such information. The web server system 15 can access this information via web services from the email server system 14 (or other calendar server system) in order to display it. The user can search for the individual whose schedule information is shown in the schedule grid 102 via the search box 105. The web server system 15 could also access other calendaring applications when set up to do so, such as third party or outside calendaring applications, including Gmail, etc.

Figure 3:
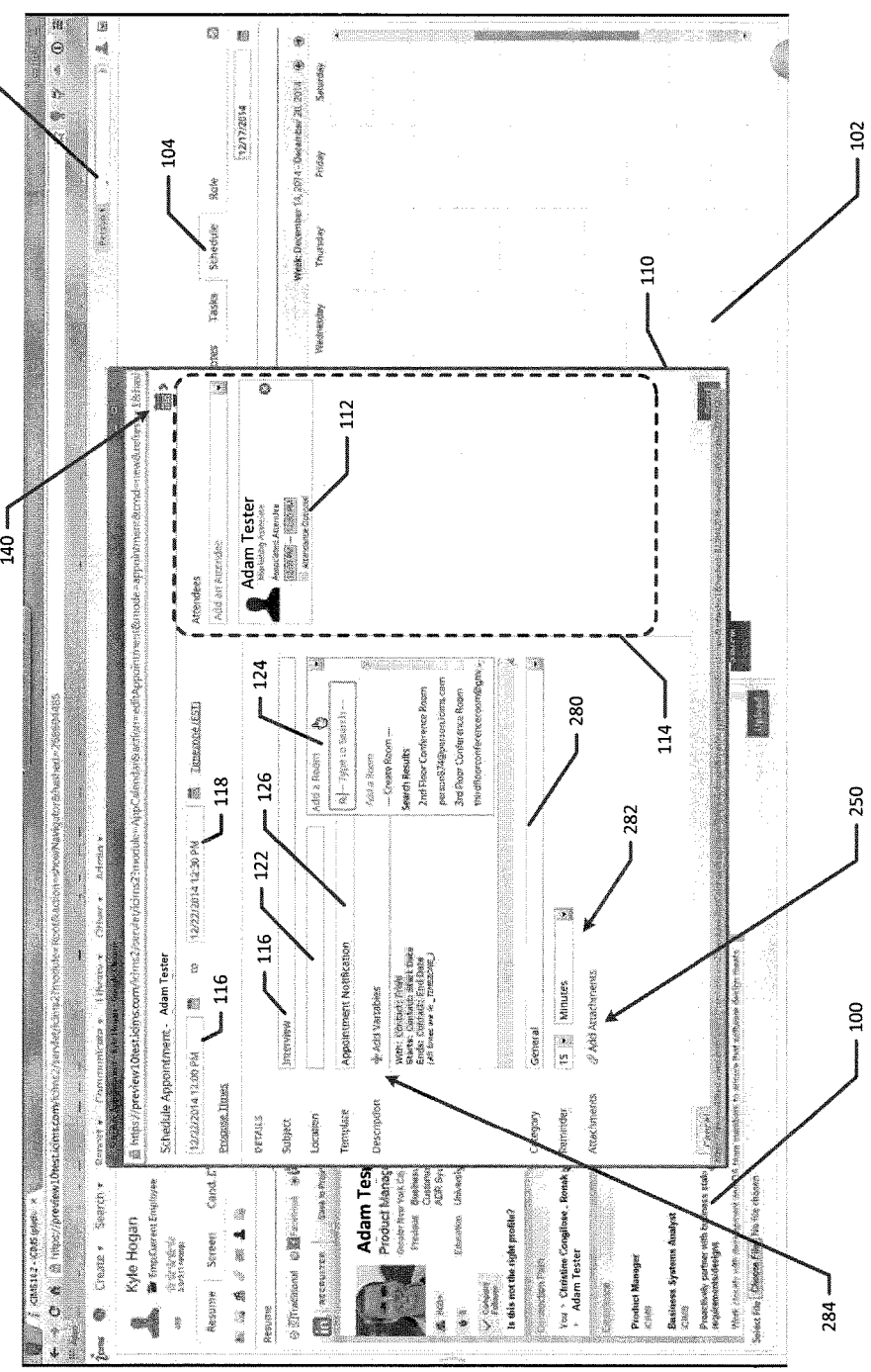

In various embodiments, the user can initiate the process of scheduling the interviews for the prospective job candidate by clicking the "Schedule" tap 104 on the upper right side of the screen. For example, clicking the "Schedule" tab 104 can cause a compound meeting scheduling window 110 to open in a new browser window, as shown in FIG. 3. In this window 110, the user can specify the times, place(s), and attendees of the sub-meetings/interviews. Because the illustrated example is for a job recruiting application where job interviews are scheduled for the candidate, the candidate will attend all of the interviews and his/her name consequently can appear by default in the upper left of the invite, and an icon 112 for the candidate appears in the attendee field 114. Through drop down windows 116, 118 or by other web-based user-interface means, the user can specify the start and stop times for each sub-meeting time slot in the compound meeting (including the date(s) of the compound meeting). Preferably the start and stop times of sub-meeting collectively span the entire time window for the compound meeting.

Figure 4:
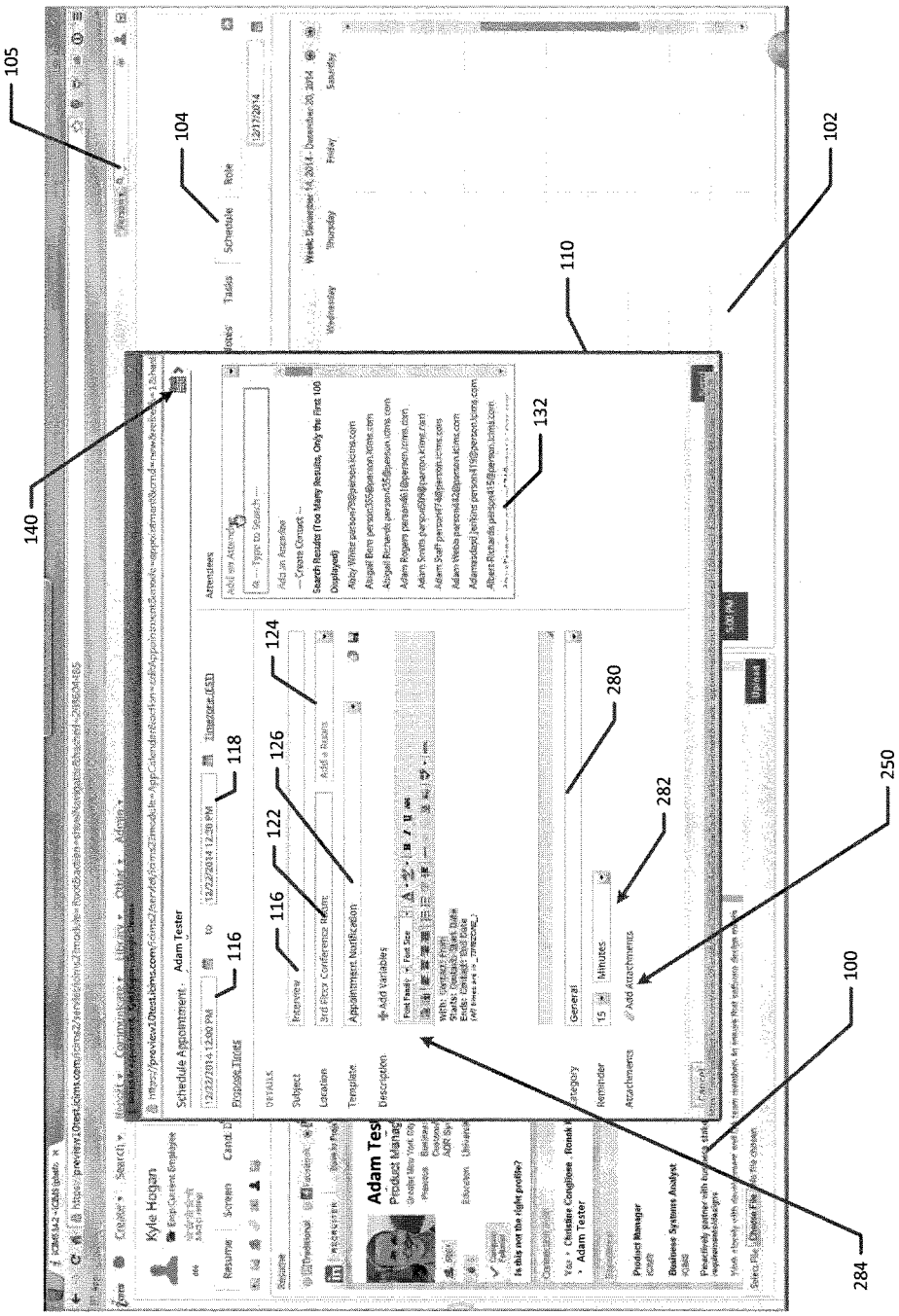

In the subject field 120 the initiator can specify the subject for the meetings (e.g., "Interview"). This specified subject can appear in the invite file attachment ultimately emailed to the invited attendees (sometimes referred to herein as "invitees") as shown below. At location field 122, the initiator can specify the location for the meeting/interviews. In various implementations, the initiator can select a desired location from a location drop down menu 124 that lists various locations associated with the enterprise that are available for the meetings (e.g., conference or meeting rooms within the enterprise), as shown in the example of FIG. 4. The web server system 15 can access a database of the enterprise's meeting rooms in order to populate the drop down menu 124. That database could be stored on a server within the organization 8, such as part of the email/scheduling server system 14.

At template field 126 the initiator can select from a drop down menu a template for the invite, such as "Appointment Notification" (as shown in the example of FIG. 3) or some other pre-established templates. The selected template can correspond to a file type that is to be emailed to the invitees of the meeting, as described further below, such as an .ics like or other suitable electronic calendar file type.

In the attendee field 114, the initiator can select the attendees for the various sub-meetings/interviews via the attendee drop down menu 132, as shown in FIG. 4. The attendee drop down menu 132 can be populated with a list of possible attendees stored in a database accessible by the web server system 15, such as a list of authorized individuals within the enterprise 8 and/or the host data center 50 (particularly for job candidates or other types of applicants). Individualized icons corresponding to the selected attendees can appear in the attendee field 114 as they are selected by the initiator (like icon 112 in FIG. 3). Once the desired attendees are selected by the initiator, in the illustrated embodiment the initiator can select (or otherwise activate) the scheduling icon 140 to schedule the desired time slots for the selected attendees.

Figure 5:
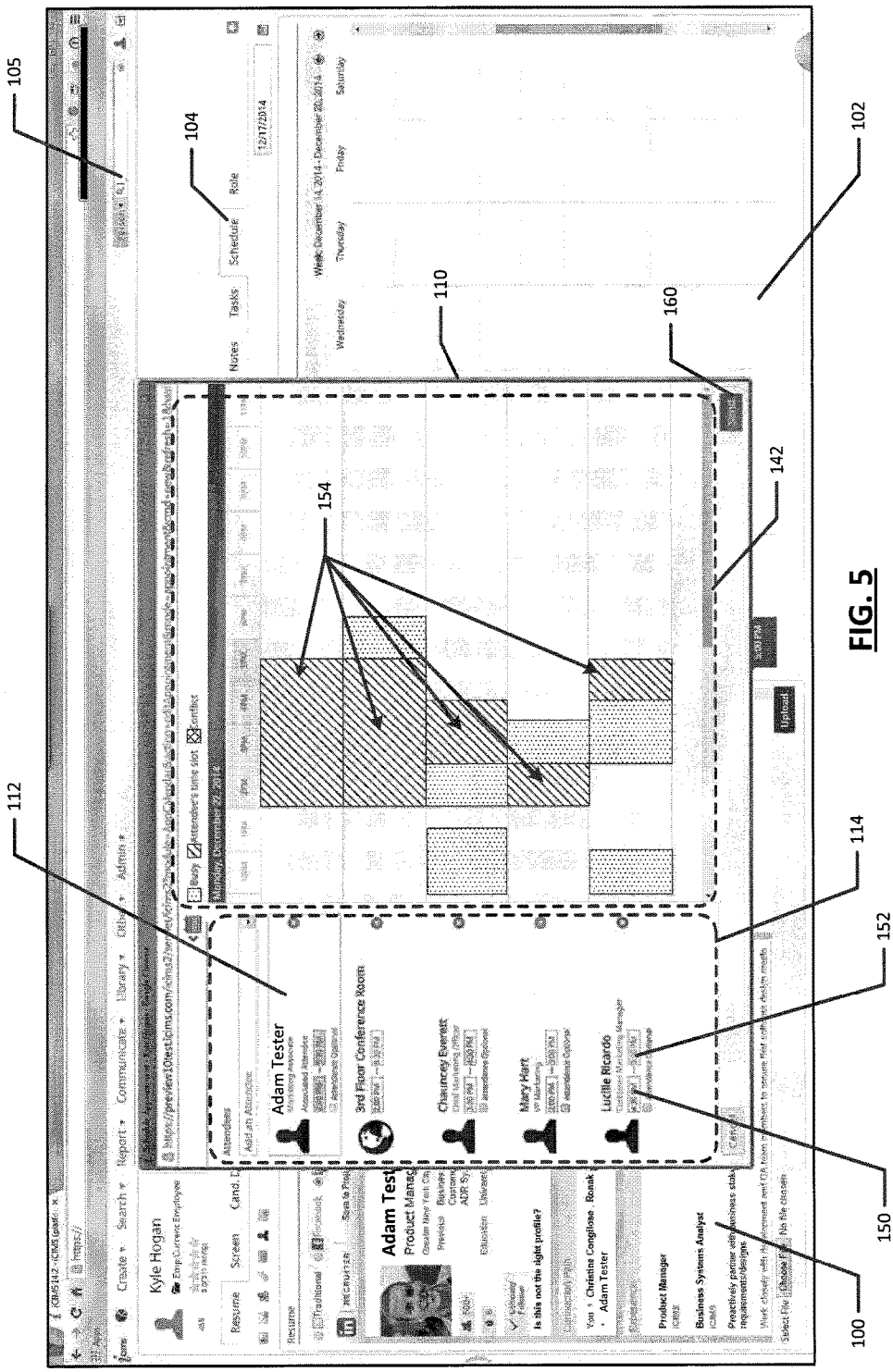

Activation of the scheduling icon 140 (shown in example FIGS. 3 and 4) can cause the compound meeting scheduling window 110 to transition (or slide to the left), as shown in the example of FIG. 5, to show (i) the invited attendees and the selected room(s) in the attendee field 114 on the left, and (ii) a scheduling grid 142 on the right that shows free and busy times for the attendees and the selected meeting room(s) on the selected day. In this illustrated example, there are four invited individuals (the candidate (Adam Tester) and three interviewers (Chauncey Everett, Mary Hart and Lucille Ricardo)); and there are to be three sub-meetings in the compound meeting. In this example, each interviewer is slated to meet individually with the candidate, one after the other, in non-overlapping sub-meetings, in the selected meeting location (in this example, the 3rd floor conference room). Of course, in other scenarios, multiple interviewers could simultaneously attend an interview at a particular time slot and/or the interviews can have overlapping sub-meeting times. As shown in the example of FIG. 5, the initiator could decide to remove one of the selected invitees by clicking the "X" associated with each selected invitee, or mark a particular invitee as optional by selecting the "Appointment Optional" checkbox associated with each selected invitee.

In the example of FIG. 5, the initiator can specify the time slot that each attendee should attend by filling in start and stop times in windows 150, 152 associated with each attendee or the user can interactively drag graphical meeting time blocks/indicators 154 in the scheduling grid to the desired time slot for each attendee. For instance, using the example of FIG. 5, the initiator could (i) drag the right-hand edge of Adam Tester's meeting time block 154 to 5:30 pm to specify that the meeting, at least as to him, ends at 5:30 pm; and (ii) drag the left-hand edge of Adam Tester's meeting time block 154 to 2:00 pm to specify that the meeting, at least as to him, starts at 2:00 pm. The initiator could drag the time blocks/indicators 154, for example, by clicking on them in the graphical user interface with their mouse or other input device, which may allow the initiator to adjust the length of the time block/indicator 154 by dragging the edges left or right as the case may be. The initiator could similarly specify the start and stop times for each of the other attendees. As such, the height of each meeting time block 154 generally corresponds to the row of the grid associated with each attendee. Setting the sub-meeting times for all of the attendees in such an interactive, dynamic way on the scheduling grid makes it easier for the initiator to visualize whether the meeting times are acceptable and give the initiator enhanced flexibility in setting the meeting times. For example, the initiator could visualize several different meeting schedule scenarios in this manner before selecting the final, desired schedule. The initiator can also set the start and stop meeting times for the meeting location(s) in the same interactive manner with the dynamic scheduling grid.

The phrase "meeting elements" is used herein to include both the meeting attendees and the meeting location(s), so in this example the meeting elements are Adam Tester, Chauncey Everett, Mary Hart, Lucille Ricardo and the 3rd floor conference room. In this example, because the candidate is being interviewed by each of the interviewers individually and one after the other, the candidate's start and stop times (for the compound meetings) are 2:00 pm to 5:30 pm and the meeting room is also scheduled for the entirety of that time. The time slots for the three interviewers cover that entire compound meeting time window (i.e., 2:00 pm to 5:30 pm) collectively. To avoid conflicts with already-scheduled appointments of the invitees (indicated by the "busy" in the scheduling grid 142) in this example, Chauncey Everett is scheduled for 3:00 pm to 4:30 pm; Mary Hart is scheduled for 2:00 pm to 3:00 pm; and Lucille Ricardo is scheduled for 4:30 pm to 5:30 pm. In this example none of the sub-meetings overlap, but in other scenarios the initiator could schedule the sub-meetings to overlap for time periods, as schedules permit. The web server 15 can access the email/scheduling server system 14 to retrieve the invitees' free and busy times in order to generate the dynamic scheduling grid 142.

In one embodiment, at least one of the meeting elements has to be scheduled for the entirety of the compound meeting. That meeting element could be either the room/ location and/or one of the attendees. In this example, since the web-based application 17 is a job candidate recruiting platform, the job candidate (Adam Tester) is by default the meeting element whose meeting time spans the entire time window of the compound meeting. To enforce this requirement, in one embodiment, if the user drags a meeting indicator 154 for an attendee outside of the time slot for the meeting element that is scheduled for the entire time window, the corresponding meeting indicator 154 for the meeting element that is scheduled for the entire time window will also expand to match the revised meeting time. For instance, in the example of FIG. 5, if the user dragged the right-edge of Lucille Ricardo' meeting indicator 154 to 6:00 pm, the right-edge of the meeting indicator 154 for Adam Tester would also automatically change to be at 6:00 pm. Similarly, if the user typed 6:00 pm in the meeting end-time field 152 for Lucille Ricardo, the meeting end-time field 152 for Adam Tester would automatically change to 6:00 pm so that he is scheduled for the entire compound meeting. In other arrangement, the user could select another meeting element to be scheduled for the entire compound meeting.

Figure 6:
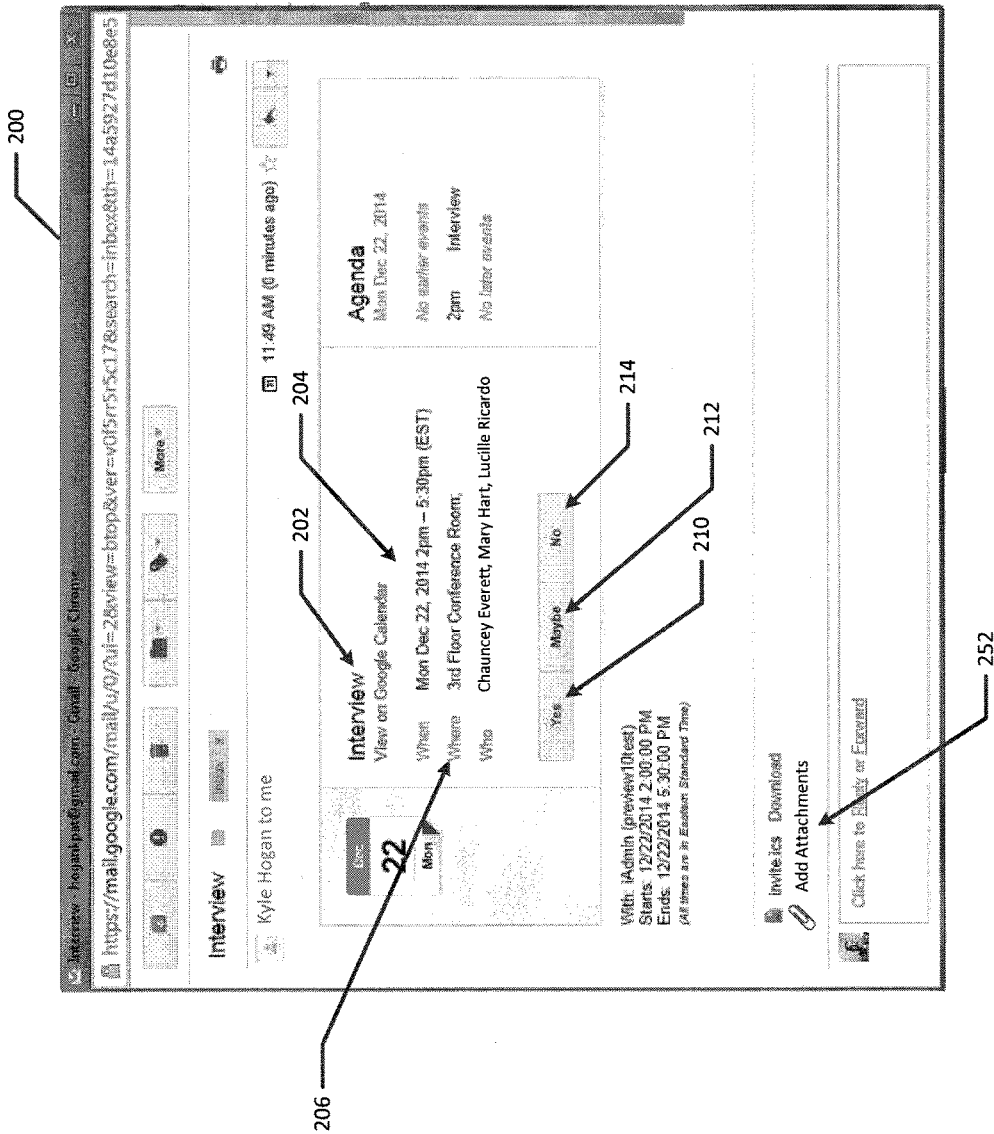

Once the initiator determines the desired meeting times, the initiator can select (or otherwise activate) the "Send" button 160 to cause the invites to be sent via email to each of the selected attendees at their specified email addresses(es), and the emails can include an attachment with the meeting data that is the file type associated with the template specified at template field 126 (see FIG. 2). The emails may be sent from the enterprise's email/scheduling server system 14, or a web-based email application if used by the user, which in either case forwards the emails to the email accounts of the invitees at their specified email address(es). The invite file attachment can be opened from the attendees' email program and added to their electronic calendar. An example invite file 200 is shown in FIG. 6. The invite 200 may specify the subject 202 that the initiator specified in the "Subject" field 120 when setting up the meeting (see FIG. 2). The invite also specifies the meeting time slot 204 and the meeting location 206, as specified by the initiator when setting up the meetings. The example of FIG. 6 shows the candidate's meeting invite, so it for 2:00 pm to 5:30 pm, as specified by the initiator. The invites for the other attendees would show their particular sub-meeting time slot (e.g., in this example, Chauncey Everett for 3:00 pm to 4:30 pm, Mary Hart for 2:00 pm to 3:00 pm, and Lucille Ricardo for 4:30 pm to 5:30 pm). Thus, in this example, separate invites are sent to the four different attendees. The recipients of the invites (e.g., the attendees) can accept, tentatively accept, or reject the invite by clicking on the "Yes," "Maybe," or "No" buttons 210, 212, 214 respectively in the invite. When the recipient selects an invite, confirmation may be sent to the initiator and/or to the web server system 15 for tracking. The enterprise email/ schedule server system 14 may also update and track the scheduling information for the attendees and the meeting location, i.e., updating the attendees' and the meeting room's free and busy times to mark the meeting time slot specified in the invite as busy (or tentative if the recipient tentatively accepts it) at the appointed time slots so that the attendees are not double-booked in scheduling other meetings on the date in question.

In Microsoft Outlook 2010 and Goggle Calendar, to set up the above-described interview schedule, the initiator would have to either: (1) set up three separate meetings—one for Tester and Everett from 3:00 pm to 4:30 pm, one for Tester and Hart from 2:00 pm to 3:00 pm, and one for Tester and Ricardo from 4:30 pm to 5:30; or (2) set up one meeting for all of the attendees that spans the entire time window from 2:00 pm to 5:30 pm. Option (1) is time consuming for the initiator because he/she has to set up three meetings rather than one and results in an increased number of invites being emailed (e.g., in this example, Tester would be emailed three different meeting invites), which increases network activity and can be confusing for the recipients (Tester might think that later invites are updates to prior updates, rather than invites to additional meetings). Option (2) is not ideal either because all of the attendees will be indicated as busy by the enterprise email/scheduling server system 14 for the entire time from 2:00 pm to 5:30 pm, even though they are not all busy that entire time, which may impair the scheduling of other meetings involving those attendees. On the other hand, various embodiments of the present invention can alleviate these drawbacks in the prior art through the above-described single set-up process, where the initiator can set up, at one time, a compound meeting with multiple sub-meetings, with each resulting meeting invite particularized to the recipient's specified sub-meeting time slot(s). That decreases network traffic, saves the initiator time, and is less confusing for the recipients.

In various embodiments, the initiator can add files as attachments to the invite (e.g., pdf files, word documents, spreadsheets, image files, etc.). In the example of FIG. 3, the initiator can click the "Add Attachments" icon 250 to add files stored on the initiator's client-computing device 12. In one implementation, attachments added to the invites in such a manner are included in the invites emailed to each of the attendees. When that is not desirable, such as when one or more of the attendees should not be in receipt of certain files, the initiator (or one of the meeting attendees could add attachments to the meeting invites for selected attendees after the meeting invites are sent. That is, for example, after the meeting invites are sent (e.g., by clicking the "Send" button 160 in FIG. 5), the initiator (or other user) could search for the desired attendee using the search box 104 (see FIG. 2), open the scheduling grid 102 for that attendee (see FIG. 2), find and click on the desired meeting notification 200 (see FIG. 6) to open the invite up, and add an attachment via the attachment icon 252 in the meeting notification 200, for example. The recipient of the invite could also add his/her own attachments in this manner.

Figure 7:
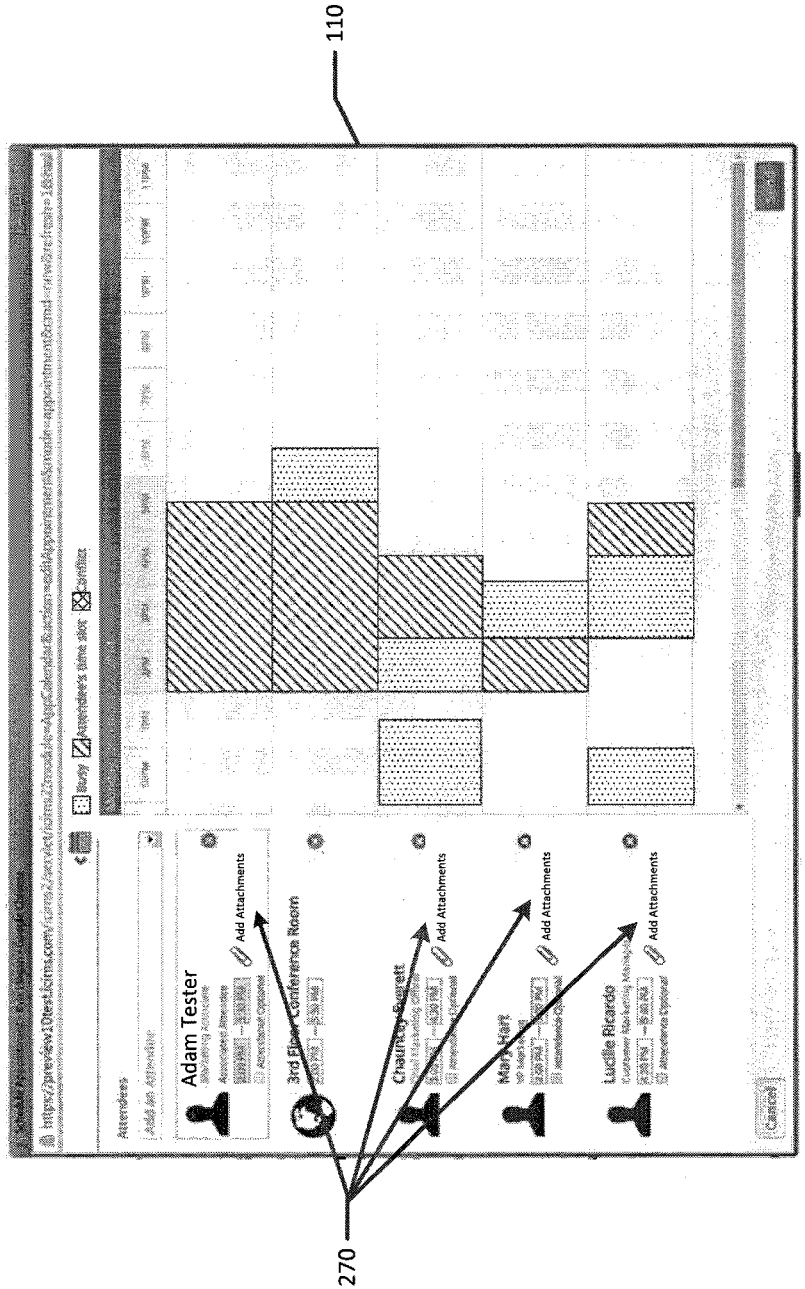

In another embodiment, the initiator could specify particular attachments for particular invitees when setting up the meeting. For example, as shown in the example of FIG. 7, the meeting set up window 100 could have an "Add Attachments" icon 270 associated with each of the selected invitees. By clicking on the "Add Attachments" icon 270 for a particular invitee, the initiator can add one or more files from the client-computing device 12 that are included only in the meeting invitation for that selected invitee. If multiple attendees, but not all, are to receive a particular attachment file(s), the initiator would have to individually add the attachment file(s) for each such invitee.

Figure 8:
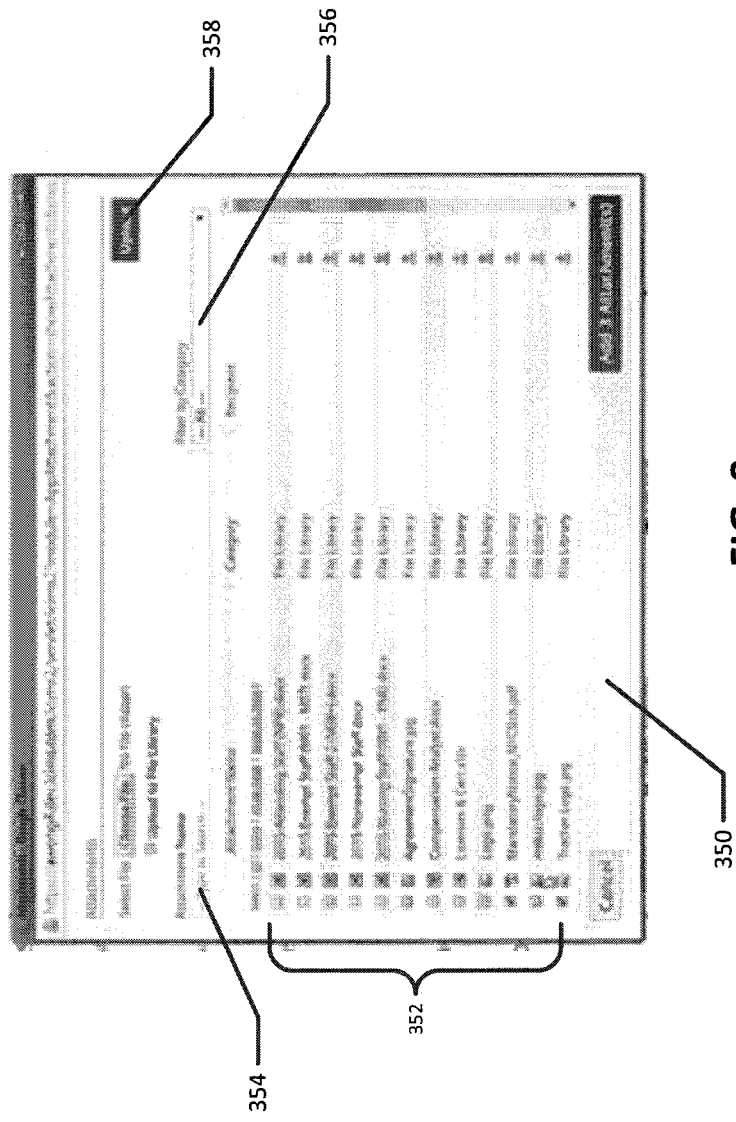

In another embodiment, when the initiator clicks the "Add Attachments" icon 250 (see FIG. 3), an attachment window 350 may open as shown in the example of FIG. 8. From the window 350, the initiator can select the desired attachments for the invites. The list of possible files 352 may be constituted from the document library 19 of the enterprise 8 and/or the initiator's client computing device 12. The initiator could search for desired files by name by typing the file name (or a portion thereof) in the search box 354 and filter files by category by selecting a desired category of files from the file category selection drop-down menu 356. Once the initiator selects the desired attachments, the initiator can activate the "Upload" button 358 to upload the selected attachments.

Figure 9:
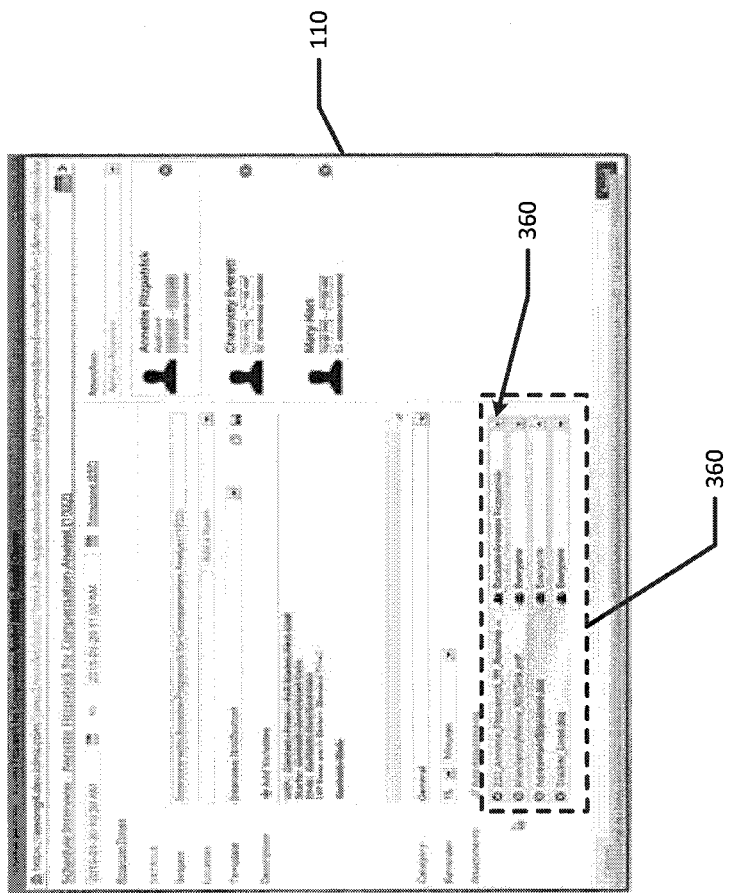
Figure 10:
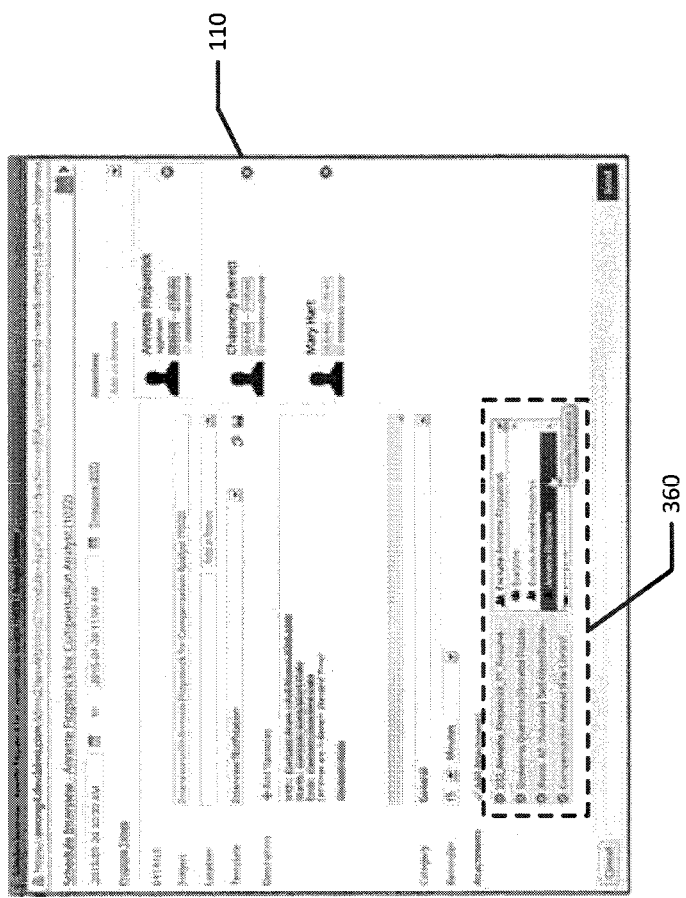

Once the selected attachments are uploaded, they can be listed at the bottom of the compound meeting scheduling window 110 in an attachment field 360, as shown in FIG. 9. In this example, four attachments were selected (and the job candidate in this example is Annette Fitzpatrick, who is only interviewing with Chauncey Everett and Mary Hart). In various embodiments, next to each selected attachment is a drop down window 362 where the initiator can select the desired recipients for the corresponding attachment. As shown in the example of FIG. 10, in one arrangement, the available attachment distribution options are: (1) everyone (e.g., all of the selected invitees); (2) everyone except a particular person(s), such as the job candidate (in the illustrated example, this option is indicated by "Exclude Annette Fitzpatrick"); and (3) the particular person(s) excluded in option (2) (e.g., Annette Fitzpatrick in this example). Option (2) might be preferred when the attachment is confidential to the enterprise and should not be shared with somebody external to the enterprise (e.g., a job candidate). Option (3) might be preferred when the attachment is tailored for somebody external to the enterprise (e.g., driving directions to the location of the job interviews). When the initiator selects the "Send" button 160, the invites are sent to the selected invitees, who receive the attachments as specified by the initiator in the attachment selection field 360. So in the example of FIG. 9, only Chauncey Everett and Mary Hart could receive Annette Fitzpatrick's resume as an attachment, and all of the invitees would receive the other three attachments.

Returning to FIGS. 3-4, the initiator may also input a category for the meeting category field 280; specify the time for reminders about the meeting in reminder field 282 (which the recipient of the invite can change if desired); and input variables for the meeting in variable field 284. The available variable options that the initiator can select may be tailored for the application 17 and the enterprise. For example, in the case where the application 17 is a job candidate recruiting platform, the variable may relate to indicating that one of the invitees is the job candidate and that he/she is interviewing for a particular position. Also, in various embodiments, the compound meeting scheduling window could comprise a field where the user could schedule the meeting or a recurring compound meeting (e.g., daily, weekly, monthly, etc.) for a specified time period or number of recurrences.

Figure 11:
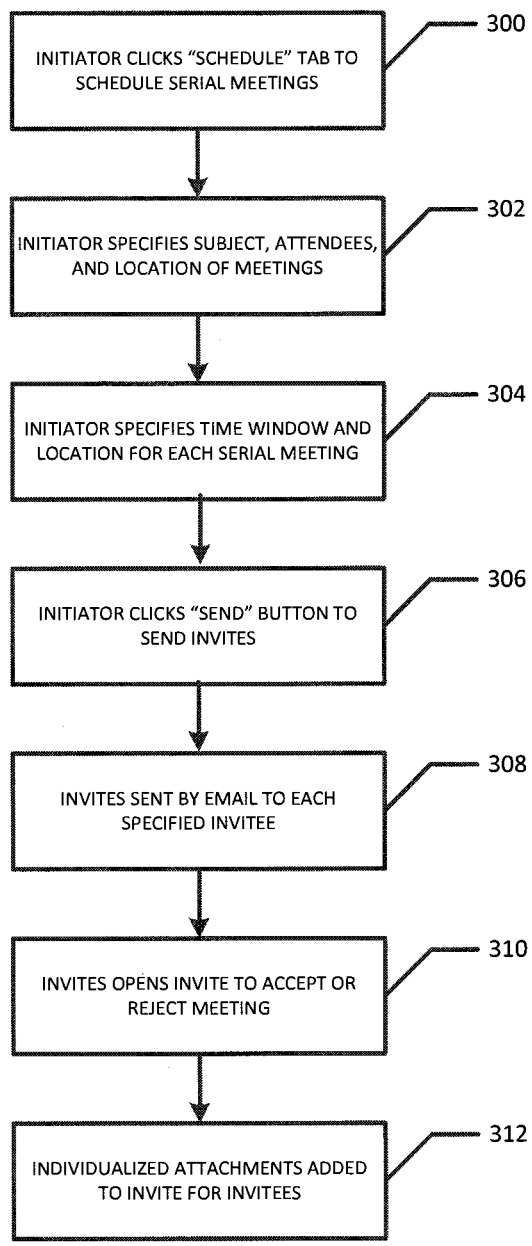
FIG. 11 is a diagram of a process flow that is executed by the computer system of FIG. 1 or 12 according to various embodiments of the present invention.

FIG. 11 is a flow chart of a process flow that can be performed by the computer system 10 of FIG. 1 according to various embodiments. At step 300, while accessing the application 17 via the initiator's browser 36 (see FIG. 1), the initiator can click on otherwise activate the "Schedule" tab 104 (or other user control) that initiates the process of setting up and sending out the invites), as shown in the example of FIG. 3. At step 302, the initiator can specify the details for the meeting as shown in the example of FIGS. 3-4, including specifying the subject of the meetings, the attendees, the location(s) of the meetings, etc. At step 304, the initiator can specify the time windows for each of the sub-meetings for the "meeting elements," e.g., the invitees and the location(s), such as by using the dynamic, web-based, graphical scheduling grid shown in the example of FIG. 5. In various embodiments, the meeting times are set relative to the time zone of the meeting location. If no meeting location is specified (e.g., for a teleconference or video conference), the time zone of the initiator can be used. The email/calendaring server system 14 can translate the meeting times to the appropriate time zones for the invited individuals in different time zones depending, for example, on the configuration of the recipient's computer (time zone setting, daylight saving setting, etc.) At step 306, the initiator can add the desired attachments as described above in connection with FIGS. 8-10. At step 308, once the initiator has set the desired meeting details the initiator can click or otherwise activate the send button 140, to cause the email invites to be sent to the desired invitees at step 310. At step 312, the invitees can open the invite attachments to their email to accept or reject the meeting. In other options, as described above, instead of attaching attachments at step 306, the initiator (or some other user) can add documents relevant to the meeting for a particular invitee by opening that invitee's calendar view and clicking on the invite to add the attachments, as shown in example of FIG. 6.

In one general aspect, therefore, the present invention is directed to a computer system 10 comprising: an application (e.g., web) server system 15 that hosts an application 17 (e.g., a web-based application); a messaging (e.g., email) server system 14 in communication with the application server system 15; and a client computing device 12 in communication with the application server system 15 via an electronic data communication network 16, 52. The client computing device 12 can access the application 17 hosted by the application server system 15 via a browser 36 of the client computing device 12. The client computer device 12 also receives inputs from a user of the client-computing device 12, via the application 17, to schedule a compound meeting that comprises a series of two or more sub-meetings (e.g., the job candidate's individual interviews with the interviewers). Each sub-meeting can be scheduled to include at least two different individuals (e.g., the candidate and one or more interviewers). Also, at least one sub-meeting has a non-identical set of invited individuals (e.g., a least one of the sub-meetings has a different individual). Collectively, therefore, the compound meeting has three or more invited individuals. For example, in the example described above, the candidate (Adam Tester) had separate sub-meetings with Mary Hart, Chauncey Everett and Lucille Ricardo. In this example, each of the three sub-meetings had a set of individuals that was not identical to the set at any other sub-meeting, i.e., each sub-meeting had a different person, and there are four total invited individuals.

The compound meeting has a compound meeting start time and a compound meeting stop time. In the example above, the compound meeting start time was 2:00 pm and the compound meeting stop time was 5:00 pm. Each of the two or more sub-meetings has a sub-meeting start time and sub-meeting stop time. For example, Tester's and Hart's sub-meeting has a sub-meeting start time of 2:00 pm and a sub-meeting stop time of 3:00 pm, etc. The sub-meetings can be overlapping or non-overlapping. Also, the compound meeting has a plurality of meeting elements, which comprise at least (1) the three invited individuals (the example above has four invited individuals—Tester, Everett, Hart and Ricardo) and (2) the meeting location(s) for the compound meeting (3rd floor conference room in the example above).

The user of the client computing device 12 schedules the compound meeting by at least: (i) opening a compound meeting scheduling window 110 in the browser 36 in response to a command from a user of the client computing device to schedule the compound meeting (e.g., the schedule tab 104 in FIG. 2); (ii) receiving a selection of the three or more invited individuals to receive invites to attend the compound meeting in response to one or more invitee inputs from the user of the client computing device that are specified via the compound meeting scheduling window (e.g., the attendee fields 114, 132 in FIGS. 3-4); (iii) receiving a selection of the at least one meeting location for the compound meeting in response to one or more location inputs from the user of the client computing device that are specified via the compound meeting scheduling window (e.g., the location fields 122, 124 in FIG. 3); and (iv) receiving start and stop times for each invited individual (and meeting location if one is selected) for the compound meeting from the user of the client computing device that are specified via the compound meeting scheduling window (e.g., the graphical meeting time blocks/indicators 154 in FIG. 5). The received start and stop times for one of the invited individuals (a "first" invited individual) may coincide with the compound meeting start time and the compound meeting stop time, respectively. In the example above, the start and stop times for both Adam Tester coincide with the compound meeting start and stop times. In addition, the received start and stop times for a second invited individual may coincide with the sub-meeting start time and the sub-meeting stop time, respectively, of a first of the two or more sub-meetings. For example, Mary Hart's start and stop times coincide with the start and stop times for the first sub-meeting (2 pm to 3 pm). Further, the received start and stop time for a third invited individual may coincide with the sub-meeting start time and the sub-meeting stop times, respectively, of a second of the two or more sub-meetings. For example, Chauncey Everett's start and stop times coincide with the start and stop times of the second sub-meeting (3:00 pm to 4:30 pm). In addition, in the example, Lucille Ricardo's start and stop times coincide with the start and stop time of the third sub-meeting (4:30 pm to 5:30 pm). Once the compound meeting is satisfactorily set up, the email server system 14 may email (or otherwise send) the electronic invites for the compound meeting to each of the invited individuals (here, Tester, Everett, Hart and Ricardo) in response to a command from the user of the client computing device to send the invites (e.g., the "Send" button 160 in FIG. 5). As shown in the example of FIG. 6, each emailed invite 200 may specify the start and stop times for the invited individual to which the emailed invite is addressed.

In various implementations, each electronic invite can include a calendar file attachment (e.g., an .ics filed) specifying the location, start time and stop time for the invited individual to which the emailed invite is addressed. Also, the computer system may further comprise a remote host data center 50 in communication with the web server system 15 via the electronic data communication network 52. The remote host data center may store data about at least one of the invited individuals that is retrieved by the web server system 15 and displayed in the web-based application 17 in the browser 36 of the client-computing device 12 when requested by the user of the client-computing device 12. The web-based application may include, for example, an applicant tracking platform and the invited individuals that the remote data center 50 stores data about is an application for a position (e.g., a job candidate). The compound meeting scheduling window 110 may comprise a graphical user interface 142 that graphically displays a scheduling graphic in which the user of the client-computing device specifies the start and stop times for the meeting elements of the compound meeting. In such an arrangement, the scheduling graphic may include a grid that comprises a meeting time indicator 154 for each of the meeting elements. The left edge of the meeting time indicator 154 can indicate the start time for the meeting element and the right edge may indicate the stop time for the meeting element. That way, the user of the client computing device can specify the start and stop times for each meeting element by positioning the left edge of the meeting indicator in the scheduling grid for each meeting element at a desired start time and by positioning the right edge of the meeting indicator in the scheduling grid for each meeting element at a desired stop time. Also, each invite sent to the invited individuals by the email server system (or other type of messaging server system) may specify the start and stop times for the invited individual coinciding with the start and stop time specified by the user for that individual by the left and right edges of the meeting indicator for the individual. The scheduling grid may also show one or more already-scheduled meetings for the invited individuals (see FIG. 5, for example). The web server system 15 may receive the data about the already-scheduled meetings for the invited individuals from the email server system 14 or other calendaring server system.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, SSDs or hard disk drives. A computer-readable medium may also include memory storage that is physical, virtual, permanent, temporary, semipermanent, and/or semi temporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits. The amount of data elements transferred in a given period could be in the millions given the size of the markets and the applicability of this invention.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments might occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
an application server system that hosts an application;
a messaging server system in communication with the application server system;
a client-computing device in communication with the application server system via an electronic data communication network, wherein the client-computing device is for:
accessing the application hosted by the application server system with the client computing device;
receiving inputs from a user of the client computing device, via the application, to schedule a compound meeting that comprises two or more sub-meetings, wherein:
each sub-meeting is scheduled to include two or more invited individuals;
at least one sub-meeting has a non-identical set of invited individuals, such that collectively the compound meeting has three or more invited individuals, with each of the invited individuals being invited to at least one of the sub-meetings;
the compound meeting has a compound meeting start time and a compound meeting stop time;
each of the two or more sub-meetings has a sub-meeting start time and sub-meeting stop time;
the compound meeting is scheduled by at least:
the client computing device opening a compound meeting scheduling window on the client-computing device in response to a command from a user of the client-computing device to schedule the compound meeting;
wherein the compound meeting scheduling window comprises a graphical user interface that graphically displays a scheduling grid displaying times, the scheduling grid including a meeting indicator manipulable by a user of the client-computing device to specify the start and stop times of each sub-meeting for each of the invited individuals;
the client-computing device receiving a selection of the three or more invited individuals to receive invites to attend the compound meeting in response to one or more invitee inputs from the user of the client-computing device that are specified via the compound meeting scheduling window; and
receiving start and stop times for each of the three or more invited individuals from the user of the client-computing device that are specified via the compound meeting scheduling window, wherein:
the received start and stop times for a first invited individual coincides with the compound meeting start time and the compound meeting stop time respectively;
the received start and stop times for a second invited individual coincides with the sub-meeting start time and the sub-meeting stop time respectively of a first sub-meeting; and
the received start and stop time for a third invited individual coincides with the sub-meeting start time and the sub-meeting stop time respectively of a second sub-meetings; and
the messaging server system is for sending electronic invites for the compound meeting to each of the three or more invited individuals in response to a command from the user of the client-computing device to send the invites, wherein each sent invite specifies the meeting start and stop times specified via the graphical user interface for the invited individual to which the invite is addressed.

2. The computer system of claim 1, wherein each sent invite comprises a calendar file attachment specifying the start time and stop time for the invited individual to which the invite is addressed.

3. The computer system of claim 1, further comprising a remote host data center in communication with the application server system via the electronic data communication network, wherein the remote host data center stores data about at least one of the invited individuals that is retrieved by the application server system and displayed in the application by the client-computing device when requested by the user of the client-computing device.

4. The computer system of claim 3, wherein the application server provides an applicant tracking platform and the first invited individual that the remote data center stores data about is an applicant for a position.

5. The computer system of claim 1, wherein:
a left edge of the meeting indicator indicates the start time for the corresponding invited individual and a right edge indicates the stop time for the corresponding invited individual, such that the user of the client-computing device specifies the start and stop times for each invited individual by positioning the left edge of the meeting indicator in the scheduling grid corresponding to each invited individual at a desired start time and by positioning the right edge of the meeting indicator in the scheduling grid corresponding to each invited individual at a desired stop time; and
each invite sent to the invited individuals specifies the start and stop times for the invited individual coinciding with the start and stop times specified by the user for the invited individual by the left and right edges of the meeting indicator corresponding to the invited individual.

6. The computer system of claim 5, wherein:
the compound meeting scheduling window includes a meeting location field where the user can select one or more meeting locations for the compound meeting;
the scheduling grid includes a meeting indicator for each of the one or more meeting locations; and
each invite sent to the invited individuals specifies the meeting location.

7. The computer system of claim 5, wherein the scheduling grid shows one or more already-scheduled meetings for the invited individuals, wherein the application server system receives data about the already-scheduled meetings for the invited individuals from a calendar server system.

8. The computer system of claim 1, wherein:
the client-computing device is further for receiving from the user via the compound meeting scheduling window a command to add an attachment to the invites; and
the messaging server system is for including the attachment in the invites sent to the invited individuals.

9. The computer system of claim 8, wherein the compound meeting scheduling window comprises an attachment field that permits the user to:
select one or more attachments to be sent with the invites; and
specify which of the one or more selected attachments is to be sent to the invited individuals in the invites.

10. The computer system of claim 1, wherein:
the application server system comprises a web server system;
the application comprises a web-based application; and
the client computing device comprises a browser for accessing the web-based application.

11. The computer system of claim 10, wherein the messaging server system comprises an email server system.

12. The computer system of claim 11, further comprising a calendar server system stores meeting information for at least one of the invited individuals and tracks responses to the invites from the invited individuals.

13. A computer-implemented method comprising:
hosting, by an application server system, an application;
scheduling, by a user of a client-computing device, a compound meeting through the application hosted by the application server system that is in communication with the client-computing device via an electronic data communication network, wherein:
the compound meeting comprises two or more sub-meetings;
each sub-meeting is scheduled to include two or more invited individuals;
at least one sub-meeting has a non-identical set of invited individuals, such that collectively the compound meeting has three or more invited individuals, with each of the invited individuals being invited to at least one of the sub-meetings;
the compound meeting has a compound meeting start time and a compound meeting stop time;
each of the two or more sub-meetings has a sub-meeting start time and sub-meeting stop time; and
scheduling the meeting comprises:
opening a compound meeting scheduling window on the client-computer device in response to a command from the user of the client-computing device to schedule the compound meeting;
wherein the compound meeting scheduling window comprises a graphical user interface that graphically displays a scheduling grid displaying times, the scheduling grid including a meeting indicator manipulable by a user of the client-computing device to specify the start and stop times of each sub-meeting for each of the invited individuals;
receiving a selection of the three or more invited individuals to receive invites to attend the compound meeting in response to one or more invitee inputs from the user of the client-computing device that are specified via the compound meeting scheduling window; and
receiving start and stop times for each of the three or more invited individuals from the user of the client-computing device that are specified via the compound meeting scheduling window, wherein:
the received start and stop times for a first invited individual coincides with the compound meeting start time and the compound meeting stop time respectively;
the received start and stop times for a second invited individual coincides with the sub-meeting start time and the sub-meeting stop time respectively of a first of the two or more sub-meetings; and
the received start and stop time for a third invited individual coincides with the sub-meeting start time and the sub-meeting stop time respectively of a second of the two or more sub-meetings; and
sending, by an electronic messaging server system that is communication with the application server system, electronic invites for the compound meeting to each of the invited individuals in response to a command from the user of the client-computing device to send the invites, wherein each electronic invite specifies the meeting start and stop times specified via the graphical user interface for the invited individual to which the invite is addressed.

14. The method of claim 13, wherein each sent invite comprises a calendar file attachment specifying the start time and stop time for the invited individual to which the invite is addressed.

15. The method of claim 13, further comprising storing, by a remote host data center that is in communication with the application server system via the electronic data communication network, data about at least one of the invited individuals that is retrieved by the application server system and displayed in the application on the client-computing device when requested by the user of the client-computing device.

16. The method of claim 15, wherein the application server provides an applicant tracking platform and the at least one of the invited individuals that the remote data center stores data about is an applicant for a position.

17. The method of claim 13, wherein:
a left edge of the meeting indicator indicates the start time for the corresponding invited individual and a right edge indicates the stop time for the corresponding invited individual, such that the user of the client computing device specifies the start and stop times for each invited individual by positioning the left edge of the meeting indicator in the scheduling grid for each invited individual at a desired start time and by positioning the right edge of the meeting indicator in the scheduling grid for each invited individual at a desired stop time; and
each invite sent to the invited individuals specifies the start and stop times for the invited individual coinciding with the start and stop time specified by the user for the invited individual by the left and right edges of the meeting indicator corresponding to the invited individual.

18. The method of claim 17, wherein:
the compound meeting scheduling window includes a meeting location field where the user can select one or more meeting locations for the compound meeting;
the scheduling grid includes a meeting indicator for each of the one or more meeting locations; and
each invite sent to the invited individuals specifies the meeting location.

19. The method of claim 18, wherein the scheduling grid shows one or more already-scheduled meetings for the invited individuals, wherein the application system receives data about the already-scheduled meetings for the invited individuals from a calendaring server system.

20. The method of claim 13, further comprising:
receiving, by the client-computing device from the user via the compound meeting scheduling window, a command to add an attachment to the electronic invites; and
including, by the messaging server system, the attachment in the invites sent to the invited individuals.

21. The method of claim 13, wherein the compound meeting scheduling window comprises an attachment field that permits the user to:
select one or more attachments to be sent with the invites; and
specify which of the one or more selected attachments is to be sent to the invited individuals in the invites.

22. The method of claim 13, further comprising, after sending the invites:
viewing calendar information, via the application at the client computing device, for a first one of the invited individuals;
opening a calendar file attachment for the first one of the invited individuals; and
adding an attachment to the calendar file attachment for the first one of the invited individuals.

23. The method of claim 13, further comprising tracking, by a calendaring server system, responses to the invites from the three or more invited individuals.

24. The method of claim 13, wherein:
the application server system comprises a web server system;
the application comprises a web-based application; and
the client computing device comprises a browser for accessing the web-based application.

25. The method of claim 24, wherein the messaging server system comprises an email server system that emails the invited to the invited individuals.

* * * * *